(12) United States Patent
Ferguson

(10) Patent No.: US 11,411,926 B2
(45) Date of Patent: *Aug. 9, 2022

(54) RELIABLE DATA TRANSFER PROTOCOL FOR UNIDIRECTIONAL NETWORK SEGMENTS

(71) Applicant: Science Applications International Corporation, Reston, VA (US)

(72) Inventor: Travis Ferguson, Powell, TN (US)

(73) Assignee: Science Applications International Corporation, Reston, VA (US)

(*) Notice: Subject to any disclaimer, the term of this patent is extended or adjusted under 35 U.S.C. 154(b) by 100 days.

This patent is subject to a terminal disclaimer.

(21) Appl. No.: 17/029,186

(22) Filed: Sep. 23, 2020

(65) Prior Publication Data

US 2021/0385191 A1 Dec. 9, 2021

Related U.S. Application Data

(63) Continuation of application No. 16/895,126, filed on Jun. 8, 2020, now Pat. No. 10,834,057.

(51) Int. Cl.
*H04L 9/40* (2022.01)
*H04L 69/166* (2022.01)
(Continued)

(52) U.S. Cl.
CPC ............ *H04L 63/029* (2013.01); *H04L 12/66* (2013.01); *H04L 63/0263* (2013.01);
(Continued)

(58) Field of Classification Search
CPC ... H04L 63/029; H04L 12/66; H04L 63/0263; H04L 63/0428; H04L 69/08; H04L 69/166; H04L 63/126; H04L 69/26
See application file for complete search history.

(56) References Cited

U.S. PATENT DOCUMENTS 8,498,206 B2 * 7/2013 Mraz .................. H04L 12/5601 370/231
10,270,745 B2 * 4/2019 Rotvoid ................ H04L 9/0822
(Continued)

FOREIGN PATENT DOCUMENTS

WO 2016189264 A1 12/2016
WO 2019007582 A1 1/2019

OTHER PUBLICATIONS

Nov. 2012, T. Paila et al. RFC:6726 "FLUTED—File Delivery over Unidirectional Transport".

*Primary Examiner* — Kyaw Z Soe
(74) *Attorney, Agent, or Firm* — Banner & Witcoff, Ltd.

(57) ABSTRACT

A unidirectional transfer protocol allows data to be transmitted from a non-secure network into a secure network. A non-secure gateway may receive data and/or information, intended for the secure network, from one or more devices. The gateway may fragment the data and/or information into smaller chunks and transmit the chunks to a secure gateway via a unidirectional communication channel. The secure gateway may verify the chunks using one or more rules and reassemble the chunks when the data is validated. The reassembled data may be sent across a secure network enclave. The unidirectional transfer protocol may provide a hardware-agnostic solution for transmitting data over a unidirectional communication channel.

20 Claims, 8 Drawing Sheets

(51) Int. Cl.
*H04L 69/08* (2022.01)
*H04L 12/66* (2006.01)

(52) U.S. Cl.
CPC .......... *H04L 63/0428* (2013.01); *H04L 69/08* (2013.01); *H04L 69/166* (2013.01)

(56) References Cited

U.S. PATENT DOCUMENTS

2017/0339191 A1* 11/2017 Kim ................. H04L 29/06
2017/0339217 A1* 11/2017 Morrill ............... H04L 67/18

* cited by examiner

RELIABLE DATA TRANSFER PROTOCOL FOR UNIDIRECTIONAL NETWORK SEGMENTS

CROSS REFERENCE TO RELATED APPLICATIONS

This application is a continuation of co-pending application U.S. application Ser. No. 16/895,126, filed on Jun. 8, 2020 and entitled "Reliable Data Transfer Protocol for Unidirectional Network Segments," the entirety of which is hereby incorporated in its entirety by reference.

BACKGROUND

Transmitting data via a unidirectional communication channel oftentimes requires specialized hardware and/or driver solutions. However, the specialized hardware and/or driver solutions may be expensive. Moreover, the specialized hardware and/or driver solutions are ill-suited for cloud-based solutions. In this regard, the solutions for transmitting via a unidirectional communication channel typically require handing over the data to a specialized hardware for transmission. This creates bottlenecks and is not conducive to data being distributed and managed in the cloud. Moreover, these unidirectional communication solutions operate at the lower layers (i.e., the physical layer, the data link layer, and/or the network layer) of the OSI model. Although these solutions may be effective at delivering data, they may break application-layer data. That is, file and data transfers, as well as application programming interface (API) calls, may not reach their destination or, if they do, the data may be corrupted and unusable at the destination.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Unidirectional data transfer protocols may provide multiple inbound messages that collectively meet data transfer needs across unidirectional communication channels (e.g., data diode, satellite links, cross domain unidirectional gateways, etc.). The unidirectional data transfer protocols may use control messages to setup and tear down a communication session. The control messages may define a plurality of parameters for the communication, including how many copies of each packet should be sent and how many of those copies should be received for the communication session to be considered successful. This may allow application-layer data to be transmitted via a unidirectional communication channel without requiring specialized hardware. This hardware-agnostic solution may improve over existing solutions that require specialized hardware and/or drivers and may further improve the reliability and integrity of the data and/or information transmitted via the unidirectional communication channel.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
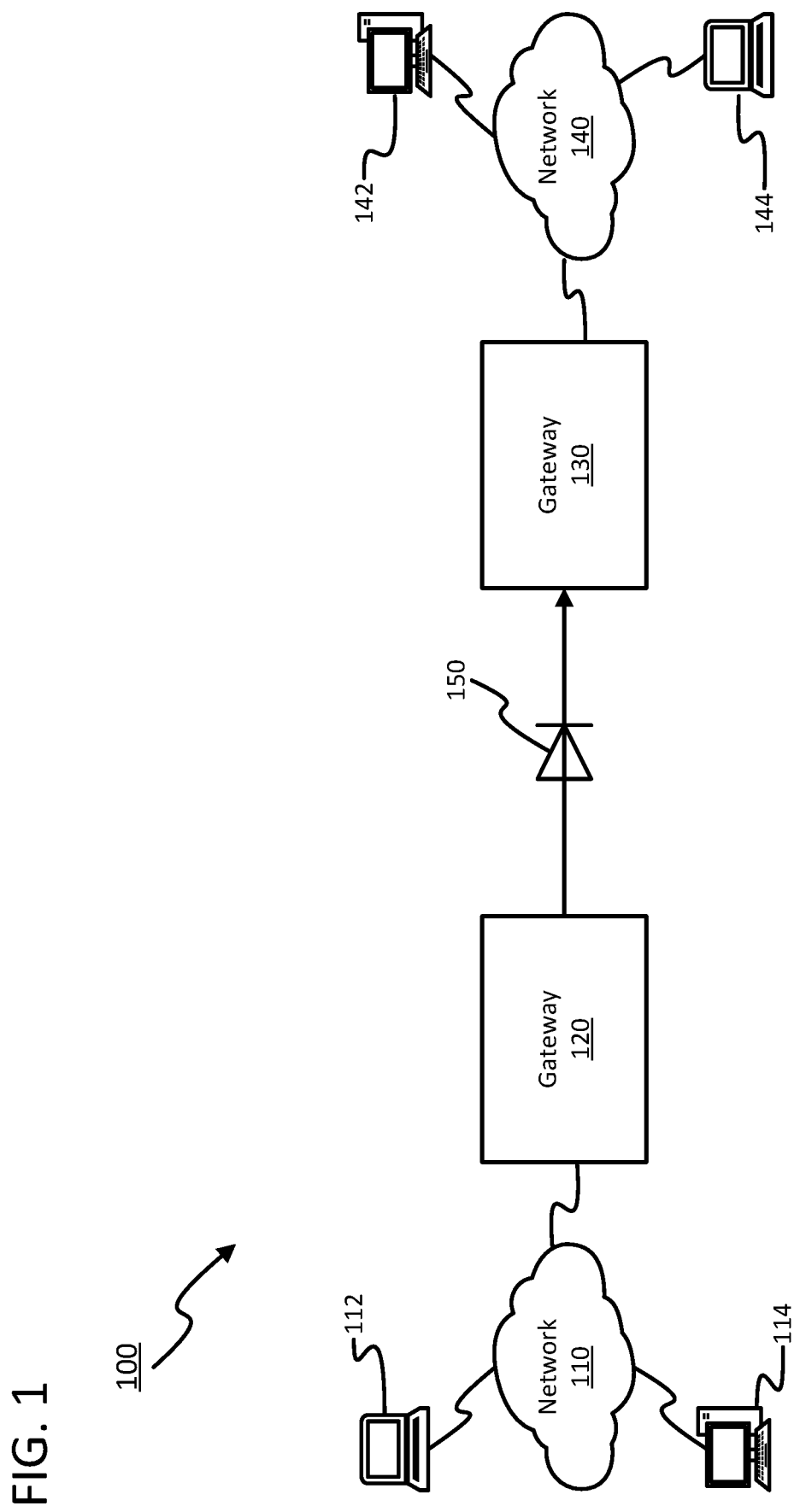
FIG. 1 shows an example of a system in which one or more features described herein may be implemented.

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or computer-readable media for securely transferring data over a unidirectional communication channel. For example, data may be received at a non-secure, sending gateway, fragmented into smaller chunks, and transmitted to a secure gateway via the unidirectional communication channel. The secure gateway may reassemble the chunks and send the data across a secure network enclave. This may provide a hardware-agnostic solution for transmitting data over a unidirectional communication channel, thereby improving over existing solutions that require specialized hardware and/or drivers. Moreover, the unidirectional data transfer protocol described herein may allow application-layer data to be transmitted over a unidirectional communication channel without breaking the application-layer data.

Methods, devices, systems, and/or computer-readable media described herein may comprise a unidirectional data transfer protocol for transferring data from a first gateway to a second gateway interconnected via a unidirectional communication channel. The unidirectional data transfer protocol may provide multiple inbound transit messages that collectively meet data transfer needs across a unidirectional communication channel (e.g., data diode, satellite links, cross domain unidirectional gateways, etc.). This unidirectional data transfer protocol may provide reliable transport across noisy network links with a far higher degree of accuracy than traditional methods, yet still allowing communications to originate from non-hardware-controlled environments, such as a cloud provider or a cloud server.

The unidirectional data transfer protocols described herein may be implemented at the application layer allowing for use where non-controlled hardware is implemented (e.g., sending across a logical data diode in a cloud environment). The unidirectional data transfer protocol may use at least three types of packets (datagrams) to send data via the unidirectional communication channel: a start control message, an end control message, and/or data packets. The start control message may be sent at the beginning of the communication session and comprise information to reassemble the data packets into full datasets, support encryption, validate the data was received, and so forth. The end control message may indicate the end of the communication session. Additionally, the start and end control messages may be used to indicate data types, including application-layer data such as Application Program Interface (API) calls, files, streams (e.g., voice, video, VOIP), and so forth. The data packets may comprise session identifiers to identify data fragments that belong together. Additionally or alternatively, the unidirectional data transfer protocol may use sequence identifiers for ordering and/or reordering received data, quorum resends to verify data is delivered, and hashes to validate packets. The secure gateway may receive the control messages and, using the data contained therein, reassemble a dataset from the received packets. The dataset may be sent (transmitted) to a destination within the secure network enclave.

FIG. 1 shows an example of a system 100 where data may be transmitted over a network connection in a single direction. System 100 may comprise a first network 110 that comprises a first gateway 120 and a second network 140 that comprises a second gateway 130. The first gateway 120 and the second gateway 130 may be interconnected via unidirectional communication channel 150.

First network 110 may be any type of non-secure network. First network 110 may comprise the Internet, a local area network (LAN), a wide area network (WAN), a wireless telecommunications network, a corporate network, a distributed corporate network, a cloud provider, a cloud service, and/or any other communication network or combination thereof. As shown in FIG. 1, a first device 112 and a second device 114 may be connected to first network 110. Further, it will be appreciated that any number of devices may be connected to first network 110. The network connections shown between first network 110, first device 110, second device 114, and gateway 120 are illustrative and any means of establishing a communications link between the computers may be used. For example, the existence and use of any of various network protocols, such as TCP/IP, Ethernet, FTP, HTTP and the like, and of various wireless communication technologies such as GSM, CDMA, Wi-Fi, WiMAX and LTE, is presumed, and the various computing devices described herein may be configured to communicate using any of these network protocols or technologies.

First device 112 may be any suitable computing device configured to perform the particular functions described herein. For example, first device 112 may be a mobile device, such as a cellular phone, a mobile phone, a smart phone, a tablet, or a laptop, and/or a personal computer, such as a terminal computing device, a desktop computing device, etc. First device 112 may provide a first user with access to a variety of applications and/or services. For example, first computing device 112 may provide the first user with access to the Internet. First device 112 may provide the first user with one or more applications located thereon. Additionally or alternatively, the first device 112 may be a server, such as a cloud server. In some examples, the first device 112 may be configured to send (transmit) data and/or information to the second network 140, via first gateway 120, second gateway 130, and unidirectional communication channel 150.

Second device 114 may be similar to the first device 112 discussed above. In this regard, the second computing device 114 may be any suitable computing device configured to allow a user to execute software for a variety of purposes as described herein. Second device 114 may belong to a first user that also accesses first device 112, or, alternatively, second device 114 may belong to a second user, different from the first user. Like the first device 112, second device 114 may be configured to send (transmit) data and/or information to the second network 140, via first gateway 120, second gateway 130, and unidirectional communication channel 150.

First gateway 120 may be a computing device capable of sending (transmitting) data and/or information from the first network 110 to the second network 140 via the unidirectional communication channel 150. In this regard, the first gateway 120 may be a router, a gateway, a proxy server, a network switch, or the like. As will be discussed in greater detail below with respect to FIG. 3, the first gateway 120 may be configured to monitor network conditions to determine validation rules for communication sessions with the second gateway. These validation rules may improve the reliability and integrity of the data and/or information sent over the unidirectional communication channel. Additionally or alternatively, the first gateway 120 may be configured to establish and teardown secure communication sessions with the second gateway 130. In this regard, the first gateway may send (transmit) a start control message to the second gateway 130 to indicate the beginning of a new communication session. During the communication session, the first gateway 120 may send a plurality of packets to the second gateway 130. Additionally, the first gateway 120 may send a predetermined number of copies of each of the plurality of packets to the second gateway 130. After the plurality of packets and the predetermined number of copies of each of the plurality of packets have been sent, the first gateway 120 may send an end control message to the second gateway 130 to indicate the conclusion of the communication session. In some examples, the first gateway 120 may encrypt the data packets prior to sending the data packets to the second gateway 130. The first gateway 120 may encrypt portions (e.g., the header, the payload, portions of the payload, etc.) of the packets. In this regard, the first gateway 120 may comprise a table of encryption keys. The table may comprise a plurality of keys and an identifier for each encryption key. The table of encryption keys may be identical to a table of encryption keys maintained on the second gateway 130.

Second network 140 may be any type of secure network. Second network 140 may be located in a Sensitive Compartmented Information Facility (SCIF), a secure network enclave, and/or other comparable facility. Like first network 110, second network 140 may comprise a local area network (LAN), a wide area network (WAN), a corporate network, and/or any other type of network or combination thereof. As shown in FIG. 1, a third device 142 and a fourth device 144 may be connected to second network 140. It will be appreciated that any number of devices may be connected to second network 140.

Third device 142 may be any suitable secured computing device configured to perform the particular functions described herein and access sensitive, confidential, secret, and/or top-secret data and/or information. For example, third device 142 may be a mobile device, such as a cellular phone, a mobile phone, a smart phone, a tablet, or a laptop, and/or a personal computer, such as a terminal computing device, a desktop computing device, etc. Third device 142 may provide a user with access to a variety of applications and services. For example, third device 142 may provide the user with one or more applications located thereon. In some examples, the third device 142 may be configured to receive data and/or information from the first network 110, via first gateway 120, second gateway 130, and unidirectional communication channel 150.

Fourth device 144 may be similar to the third device 142 discussed above. In this regard, the fourth device 144 may comprise any suitable computing device configured to provide access to sensitive, confidential, secret, and/or top-secret data and/or information. Fourth device 144 may belong to a user that also accesses third device 142, or, alternatively, fourth device 144 may belong to a different user. Like the third device 142, fourth device 144 may be configured to send (transmit) data to the second network 140, via first gateway 120, second gateway 130, and unidirectional communication channel 150.

Second gateway 130 may be any computing device capable of receiving data and/or information from the first network 110 via the unidirectional communication channel 150. The second gateway 130 may be configured to forward the received data and/or information to a destination within second network 140. As noted above, second network 140 may be a Sensitive Compartmented Information Facility (SCIF), a secure network enclave, or other comparable facility. Accordingly, the second gateway 130 may comprise a secure router, a secure gateway, a secure proxy server, a secure network switch, or the like. As will be discussed in greater detail below with respect to FIG. 4, the second gateway 130 may be configured to receive a start control message from the first gateway 120. The start control message may indicate the beginning of a new communication session. During the communication session, the second gateway 130 may receive a plurality of packets from the first gateway 120. The second gateway 130 may also receive a predetermined number of copies of each of the plurality of packets. The second gateway 130 may receive an end control message indicating the conclusion of the communication session, for example, based on the first gateway 120 having sent the plurality of packets and the predetermined number of copies of each of the plurality of packets. As noted above, the data packets may be encrypted. Accordingly, the second gateway 130 may decrypt the data packets prior to reassembling them into a dataset. The second gateway 130 may use a key identifier included in the start control message to retrieve a key from a table of encryption keys maintained on the second gateway 130. Further to the description above, the table may comprise a plurality of keys and an identifier for each encryption key and may be identical to a table of encryption keys maintained on the first gateway 120.

Unidirectional communication channel 150 may be any one-way communication channel or a one-way network segment. Unidirectional communication channel may comprise at least one of a data diode, a satellite link, a dedicated physical connection (e.g., a leased line), or the like. Unidirectional communication channel 150 may be configured to send (transmit) data and/or information from first gateway 120 to second gateway 130. However, unidirectional communication channel 150 may be configured to prevent transmission of data and/or information from second gateway 130 to first gateway 120.

Figure 2:
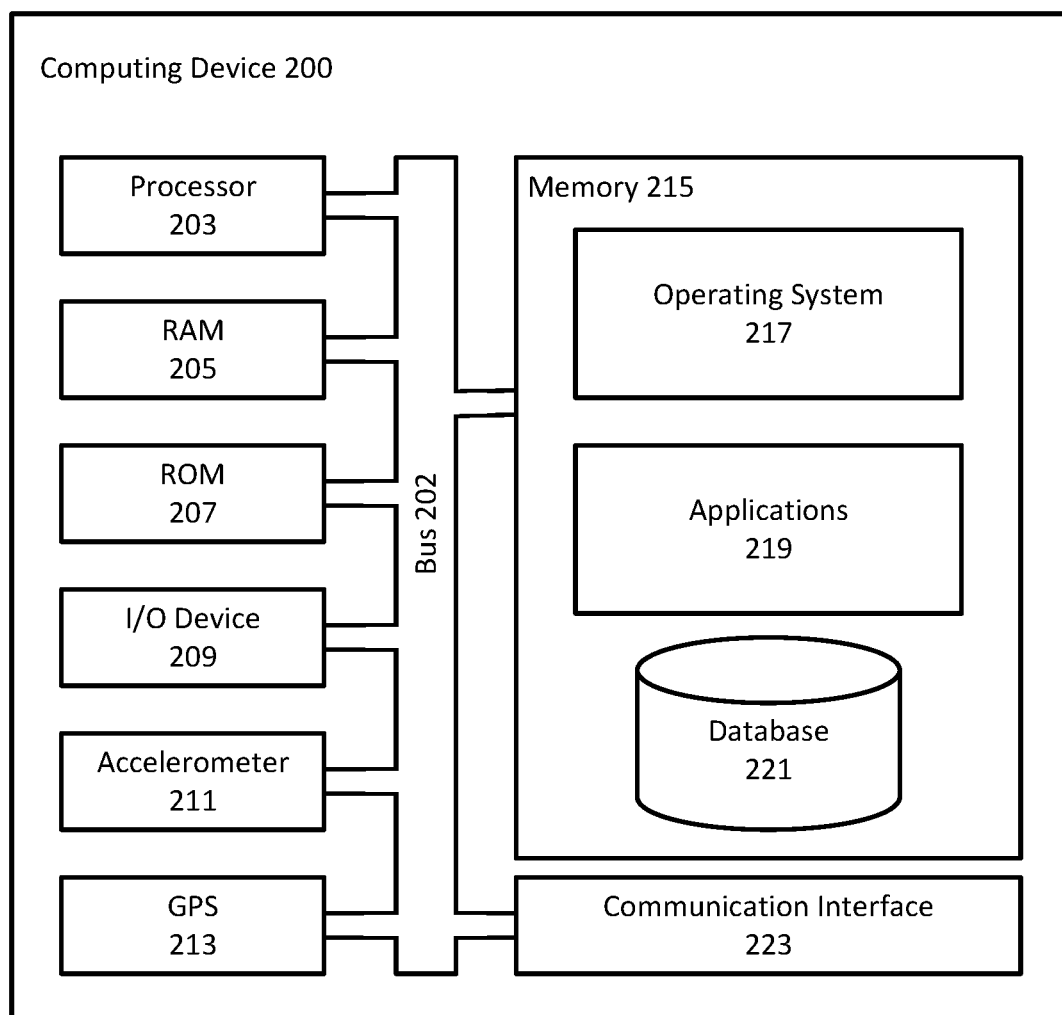
FIG. 2 shows an example computing device.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic information may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Methods, devices, systems, and/or computer-readable media described herein may comprise a unidirectional data transfer protocol for transferring data from a first device to a second device interconnected via a unidirectional communication channel. The data transfer protocol may provide multiple inbound transit messages that collectively meet data transfer needs across a unidirectional communication channel (e.g. data diode, satellite links, cross domain unidirectional gateways, etc.). This data transfer protocol may provide a reliable transport across noisy network links with a far higher degree of accuracy than traditional methods, yet still allow communications to originate from non-hardware-controlled environments, such as a cloud provider or a cloud server.

Figure 3:
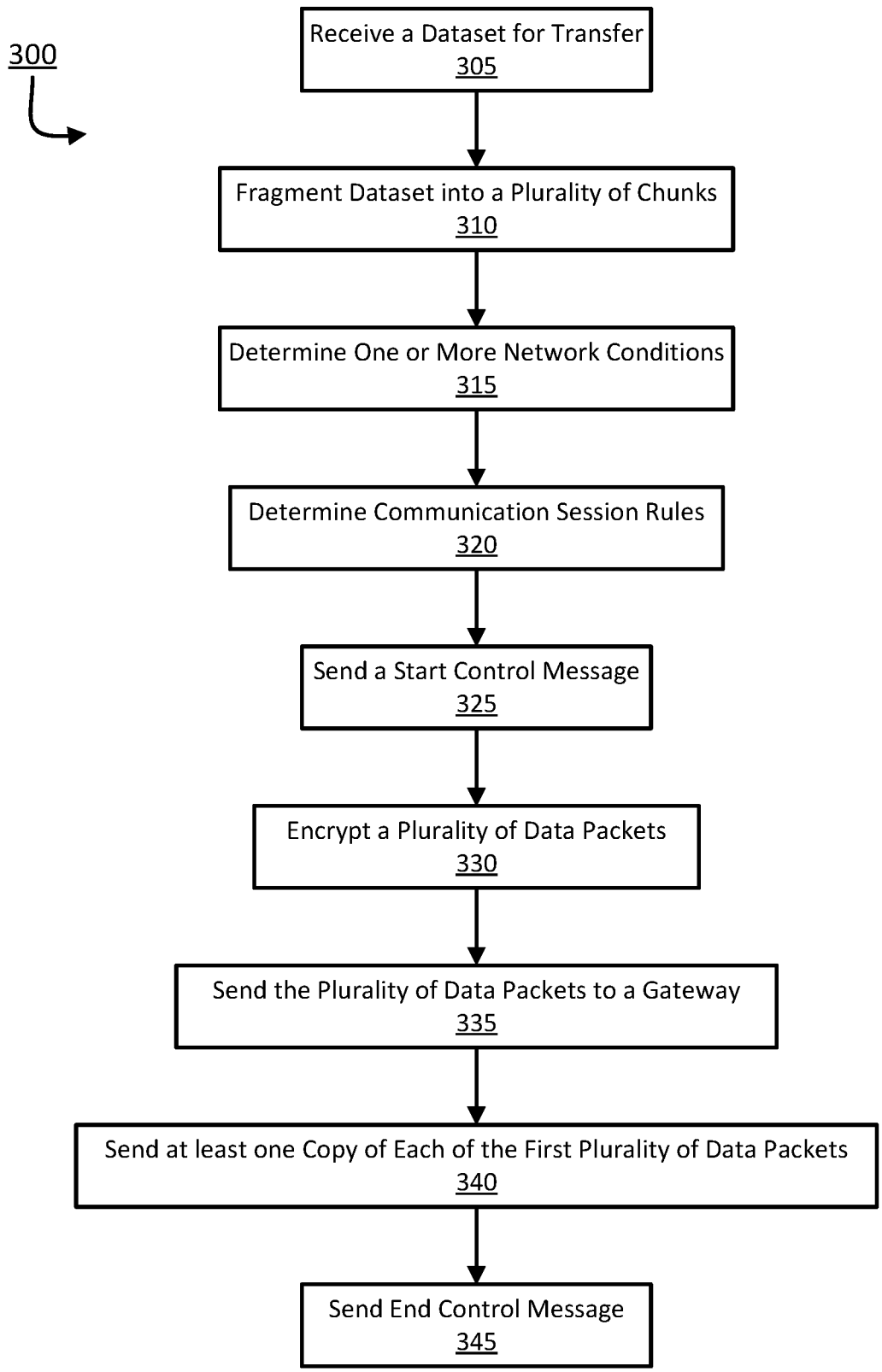
FIG. 3 shows a flow chart of an example process for sending data via a unidirectional communication channel.

As discussed above, a first device (e.g., first gateway 120) may send data and/or information to a second device (e.g., second gateway 130) via a unidirectional communication channel (e.g., unidirectional communication channel 150). FIG. 3 shows a flow chart of an example process 300 for sending data via a unidirectional communication channel. Some or all of the steps of process 300 may be performed using one or more computing devices as described herein. For example, the steps of process 300 may be performed by, and/or the first device may comprise, the gateway 120.

In step 305, a first device may receive a dataset for transfer to a second device via a unidirectional communication channel. As noted above with respect to FIG. 1, the first device may be a non-secure network device, such as a gateway, router, switch, hub, or the like. The dataset may comprise application-layer data and/or information, such as an API call, a file, a stream (e.g., voice, video, VOIP), and the like. In another example, the dataset may comprise unclassified data, such as photos, video, and/or media. The second device may be a secure network device configured to receive data and/or information from the first device. In step 310, the first device may fragment the dataset into a plurality of chunks.

In step 315, the first device may determine one or more network conditions. In this regard, the first device may monitor network traffic and, in particular, the unidirectional communication channel. In step 320, the first device may define one or more rules for the communication session. The one or more rules may be based on the detected network traffic. For example, if network traffic is heavy, the first device may send more copies of the packets. Sending more copies of the packets may slow down network traffic, but may increase the likelihood of satisfying a quorum agreement defined by the first device. Additionally or alternatively, the first device may define a quorum agreement based on one or more network conditions. A quorum agreement may define a number of data packets that must match for the transmission of the packet to be considered successful. For example, the sender may send four copies of each packet. The quorum agreement may require that, to satisfy the quorum agreement, at least two of the copies of the packet must match for the transmission of the packet to be considered successful. If three packets are received and two match, the third, non-matching packet may be discarded. In this regard, the combination of rules and adjusting the transmission characteristics (e.g., more copies, higher quorum, etc.) may improve the reliability and integrity of the data and/or information transmitted from the first gateway to the second gateway via unidirectional communication channels.

In step 325, the first device may send a start control message to the second device via a unidirectional network segment. The start control message may comprise a plurality of parameters that configure the communication session. The plurality of parameters may comprise or otherwise indicate a session identifier, a sequence identifier, a protocol version, a number of chunks in the session, a start time, an end time, a number of copies of each packet being transmitted, the quorum agreement, a source address of a sender, a time out, an identifier of the encryption key for the session, etc.

In step 330, the first device may encrypt a plurality of data packets. The plurality of data packets may comprise the plurality of data chunks. To encrypt the plurality of data packets, the first device may select an encryption key from the table of encryption keys. In this regard, the first device may use a symmetric encryption algorithm to encrypt the plurality of data packets. Alternatively, the first device may use an asymmetric encryption algorithm to encrypt the plurality of data packets. According to these examples, the first device may encrypt the plurality of data packets using a public key of the second device.

In step 335, the first device may send the plurality of data packets to the second device via the unidirectional communication channel. The plurality of data packets may be sent after the start control message. In some examples, the plurality of data packets may be sent using any transport protocol, such as user datagram protocol (UDP) or an equivalent thereof. As part of preparing the packets for transmission, the first device may generate a signature for each of the plurality of data packets. The signature may be a hash-based signature (e.g., HMAC). For example, the hash-based signature may be computed by applying a one-way hash function (e.g., MD5, SHA256, SHA512, etc.) to a header of the packet, a payload of the packet, and a secret. The secret may be a secret value (e.g., a seed) shared between the first device and the second device. Alternatively, the signature may be generated using a public key. In this regard, the first device may use a private key of the first device and a signature generating algorithm to generate the signature. The second device may verify the signature using a signature verification algorithm and a public key of the first device. The first device may append the signature to each of the plurality of data packets prior to sending the plurality of data packets to the second device.

In step 340, the first device may send at least one copy of each of the plurality of data packets to the second device via the unidirectional communication channel. The copies of each of the plurality of packets may be sent as a second plurality of data packets. The copies of each of the plurality of data packets may be sent after the plurality of data packets have been transmitted. Alternatively, the copies of each of the plurality of data packets may be sent concurrently with the plurality of data packets.

In step 345, the first device may send an end control message to the second device. The end control message may be sent after the copies of each of the plurality of data packets have been transmitted to the second device. In some examples, the first device may teardown the unidirectional communication channel.

Figure 4:
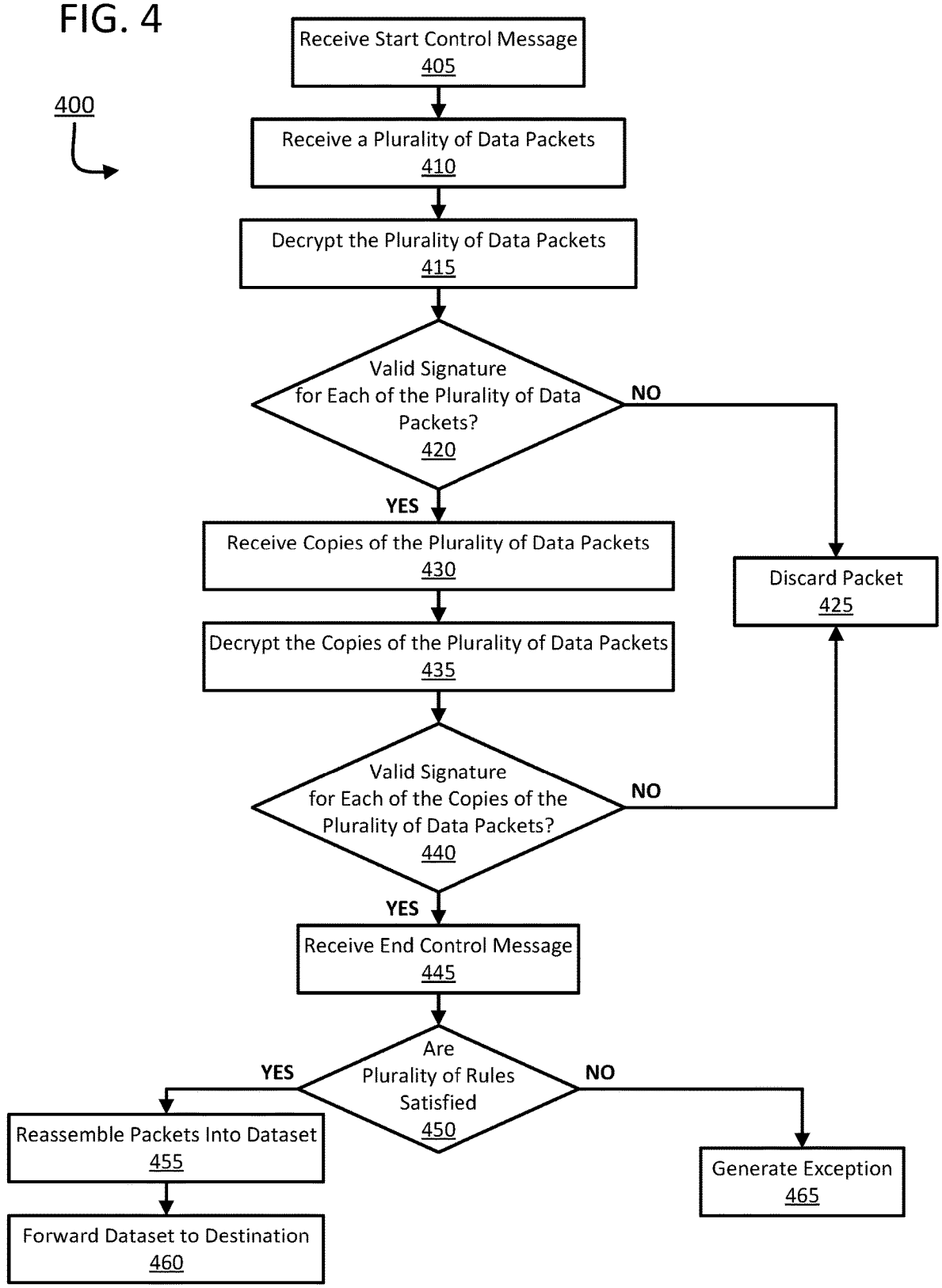
FIG. 4 shows a flow chart of an example process for receiving data via the unidirectional communication channel.

The second device may receive the plurality of packets, and their corresponding copies, to reassemble the dataset and forward the dataset to its destination. FIG. 4 shows a flow chart of an example process 400 for receiving data via the unidirectional communication channel. Some or all of the steps of process 400 may be performed using one or more computing devices as described herein. For example, the steps of process 400 may be performed, and/or the second device may comprise, the gateway 130.

In step 405, the second device may receive a start control message from the first device via a unidirectional communication channel. As noted above, the start control message may comprise and/or otherwise indicate a plurality of parameters that configure the communication session. For example, the parameters may comprise a session identifier, a sequence identifier, a protocol version, a number of chunks in the session, a start time, an end time, a number of copies of each packet being transmitted, the quorum agreement, a source address of a sender, a time out, an identifier of the encryption key for the session, etc.

In step 410, the second device may receive a plurality of data packets from the first device via the unidirectional communication channel. The plurality of data packets may be received after the start control message. In step 415, the second device may decrypt the plurality of data packets. As discussed above, the start control message may comprise an identifier of the encryption key. The first device may use the identifier to retrieve the encryption key from the table of encryption keys. Once retrieved, the encryption key may be used to decrypt the plurality of data packets. Alternatively, the plurality of packets may be encrypted using a public key of the second device. In these examples, the second device may decrypt the plurality of packets using its private key.

In step 420, the second device may verify a signature appended to each of the plurality of data packets. The second device may generate a signature for each of the plurality of data packets by applying a one-way hash function (e.g., MD5, SHA256, SHA512, etc.) to a header of the packet, a payload of the packet, and a secret. The generated signature may be compared to the received signature to determine whether the received signature is valid. Alternatively, the second device may use a public key of the first device to determine the validity of the received signature. If the signature is invalid, the second device may discard the packet in step 425. However, if the signature is valid, process 400 proceeds to step 430.

In step 430, the second device may receive one or more copies of each of the plurality of data packets. In step 435, the second device may decrypt the one or more copies of the plurality of data packets using the techniques described above. In step 440, the second device may verify the signatures appended to each of the copies of the plurality of data packets. If a signature is invalid, the second gateway may discard the packet in step 425.

In step 445, the second device may receive an end control message from the first device via the unidirectional communication channel. The end control message may signal the end of the communication session. In step 450, the second device may determine whether the plurality of rules defined in the start control message have been satisfied. In this regard, the second device may determine whether a predetermined number of duplicates (copies) of the first plurality of data packets have been received to satisfy the quorum agreement. Additionally or alternatively, the second device may determine all of the chunks defined in the start control message have been received. In further examples, the second device may determine whether all of the chunks were received within the time defined in the start control message. That is, the second device may determine whether a timeout occurred. Depending on the mode of send for the first device, the rule validation may be performed before or after the final set of messages for a particular copy are sent. In some instances, once a session identifier has been marked successful by the second device, all future chunks received with that session identifier may be ignored. A timeout on ignoring session identifiers may allow session identifier to be reused for future transmissions. As discussed above, the rules used herein may improve the reliability and integrity of the data and/or information transmitted via the unidirectional communication channel. If all of the conditions above are satisfied, the second gateway may reassemble the first plurality of data packets into a dataset in step 455. In step 460, the second device may forward the dataset to a destination. As noted above, the destination may be one or more computing devices located within a secure network. However, if any of the conditions are not satisfied, the second device may generate an exception in step 465. In some examples, the second gateway may notify a user of the exception.

The unidirectional data transfer protocol described above may provide a reliable means of transporting data and/or information across noisy network links with a far higher degree of accuracy than traditional methods, yet still allow communications to originate from non-hardware-controlled environments, such as a cloud provider or a cloud server. Additionally, the unidirectional data transfer protocol described herein may allow content (e.g., photos, video, media, etc.) that is initially unclassified to be reclassified (e.g., sensitive, confidential, secret, and/or top-secret) based on the context of how the content was shared via the unidirectional transfer protocol and where the content is being stored.

Figure 5:
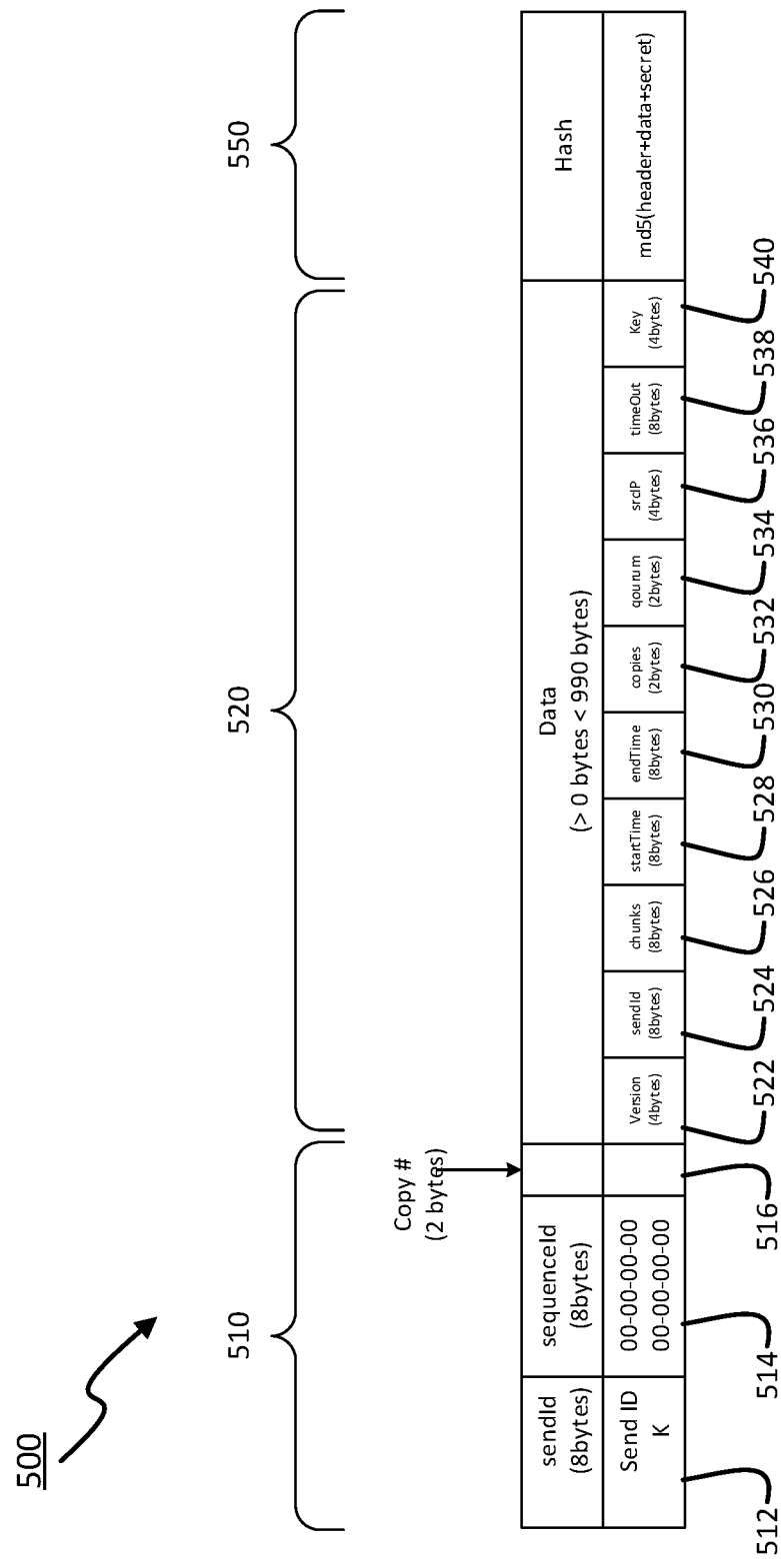
FIG. 5 shows an example of a start control message.

The unidirectional data transfer protocol described herein may comprise a unique packet, or datagram, format. For example, each of the packets may comprise 1024 bytes, with an 18-byte header, 0-990 bytes of data, and a 16-byte signature. As noted above, the unidirectional data transfer protocol may comprise at least 3 types of packets (or datagrams): a start control message, a data packet, and an end control message. In this regard, FIG. 5 shows an example of a start control message 500.

The start control message 500 may comprise a header 510, a payload 520, and a signature 550. The header 510 may comprise a plurality of fields. For example, header 510 may comprise a session identifier field 512, a sequence identifier field 514, and a copy field 514. The session identifier field 512 may comprise a unique identifier that identifies the communication session. Each packet belonging to the communication session may have the same session identifier in the session identifier field 512. The session identifier field 512 may comprise 8 bytes. Values for lengths of data fields provided herein and in the drawings are examples, and lengths of one or more data fields described herein may vary. The sequence identifier field 514 may indicate where in the plurality of packets associated with the communication the packet belongs. The start control message 500 may comprise a zeroed-out sequence identifier 514. That is, the sequence identifier field 514 of the start control message 500 may comprise all zeroes to indicate the start of a new communication session. Like the session identifier field 512, the sequence identifier field may comprise 8 bytes. The copy field 516 may indicate the copy number of the current start control message 500. As noted above, the first device may send (transmit) a plurality of copies to ensure that the packet receives at its intended destination, uncorrupted. The copy field 516 may indicate copy number of the packet. For instance, a first copy of a packet may have all zeroes in copy field 516; the copy field 516 of the second copy of the packet may be represented by a 1 (e.g., in binary or hexadecimal); and so on.

The payload 520 may comprise a plurality of fields that provide information about the data collection process. For example, the payload 520 of the start control message 500 may comprise a version field 522, a sendID field 524, a chunks field 526, a start time field 528, an end time field 530, a copies field 532, a quorum field 534, a source IP address field 536, a timeout field 538, and a key identifier field 540. The version field 522 may be a 4-byte field that indicates which version of the protocol to use. The sendID field 524 may indicate the session identifier (also indicated in the header 510). Like the session identifier field 512 in the header 410, the sendID field 524 may comprise 8 bytes. The chunks field 526 may indicate how many data packets may be in the communication session. The chunks field 526 may comprise 8 bytes. The start time field 528 may indicate the start time of the communication session. Similarly, the end time field 530 may indicate the end time of the communication session. Both the start time field 528 and the end time field 530 may indicate the time as a UTC epoch in milliseconds. The start time field 528 and the end time field 530 may each comprise 8 bytes. The copies field 532 may indicate the quantity (e.g., number) of copies of each packet that will be sent. For example, if the copies field 532 indicates four, then four copies of each packet in the communication session will be transmitted from the first gateway to the second gateway. The copies field may comprise 2 bytes. The quorum field 534 may indicate the quantity of matching packets that must be received for the communication session to be considered successful. The quorum field 534 may comprise 2 bytes. The source IP address field 536 may comprise a network address of a sender of the data and/or information. In this regard, the network address may be a network address of a device located behind the first gateway. Also or alternatively, the source IP address field 536 may comprise a network address of the first gateway. The timeout field 538 may indicate a time limit to wait for all the packets in the communication session. The timeout field 538 may comprise 8 bytes. After the timeout, the session identifier may be re-used. Finally, the key identifier field 540 may indicate an encryption key used to encrypt the packets in the communication session.

The signature 550 may be a message authentication code used to verify (validate) the start control message 500. As noted above, signature 550 may be generated by hashing the header 510, the payload 520, and a secret. The secret may be a secret value (e.g., a seed) shared between the first gateway and the second gateway. Also or alternatively, the signature may be generated using a public key. In this regard, the first gateway may use a private key of the first gateway, the header, the payload, and a signature generating algorithm to generate the signature. The second gateway may verify the signature using a signature verification algorithm and a public key of the first gateway.

Figure 6:
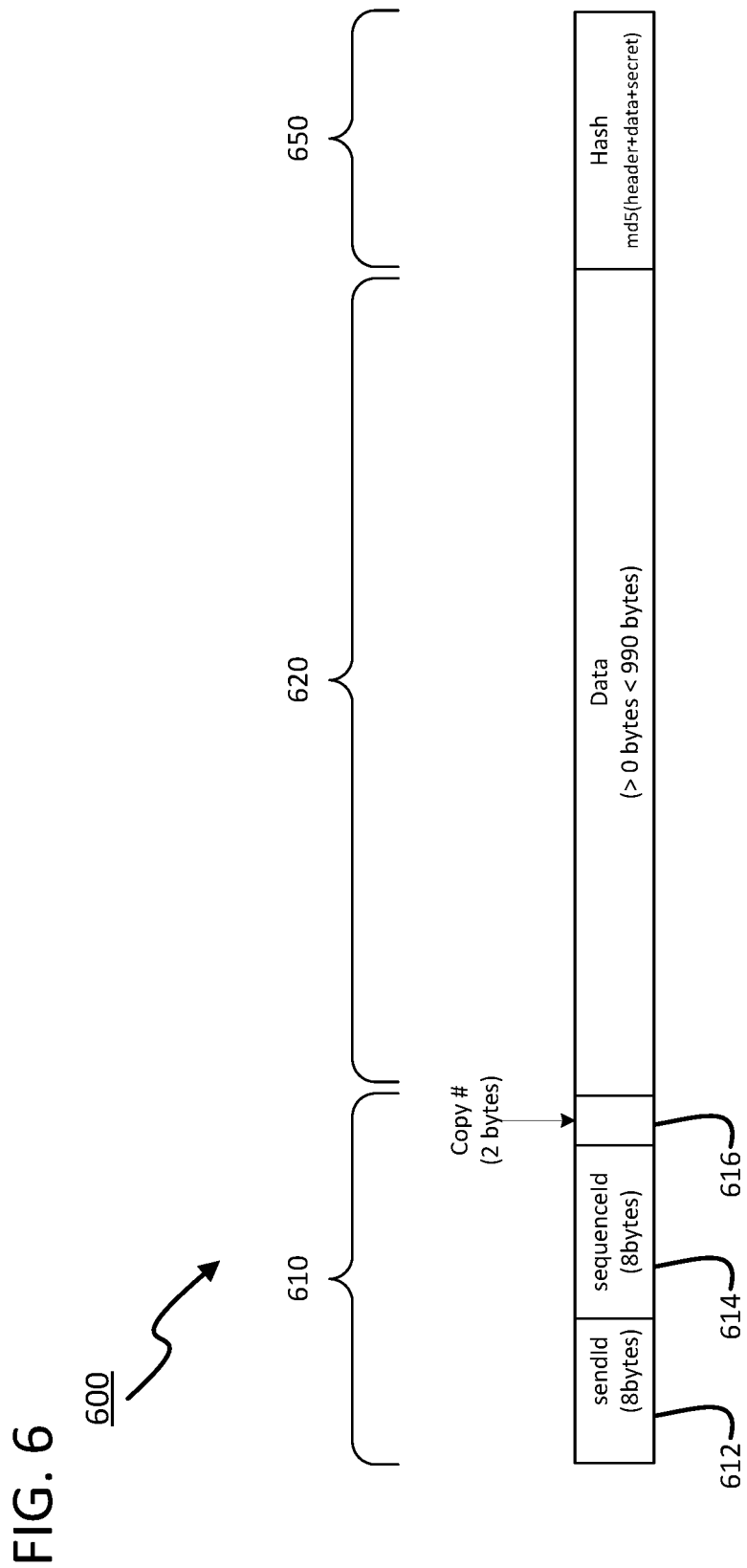
FIG. 6 shows an example of a data packet.

After transmitting the start control message, the first device may begin transmitting one or more data packets. FIG. 6 shows an example data packet 600.

Like start control message 500, data packet 600 may comprise a header 510, a payload 620, and a signature 650. Header 610 may comprise a session identifier field 612, a sequence identifier field 614, and a copy field 614. The session identifier field 612 may contain the same unique identifier included in the session identifier field 512 of start control message 500. The sequence identifier field 614 may indicate where in the plurality of packets associated with the communication session the packet belongs. In this regard, data packets may be identified by non-zero sequence numbers, which occur in order (e.g. sequence 1, 2, 3, 4, 5) of the data chunks contained in them. The copy field 616 may indicate the copy number of the current data packet 600.

The payload 620 may comprise one or more data chunks. As noted above, Application Program Interface (API) calls, files, streams (e.g., voice, video, VOIP), and so forth may be fragmented into data chunks for transmission to the second gateway. The data chunks may be placed in payload 620 (e.g., after being encrypted) for transmission to the second gateway.

The signature 650 may be a message authentication code used to verify (validate) the data packet 600. As noted above, signature 650 may be generated by hashing the header 610, the payload 620, and a secret. Also or alternatively, the signature may be generated using a private key of the first gateway, the header, the payload, and a signature generating algorithm.

Figure 7:
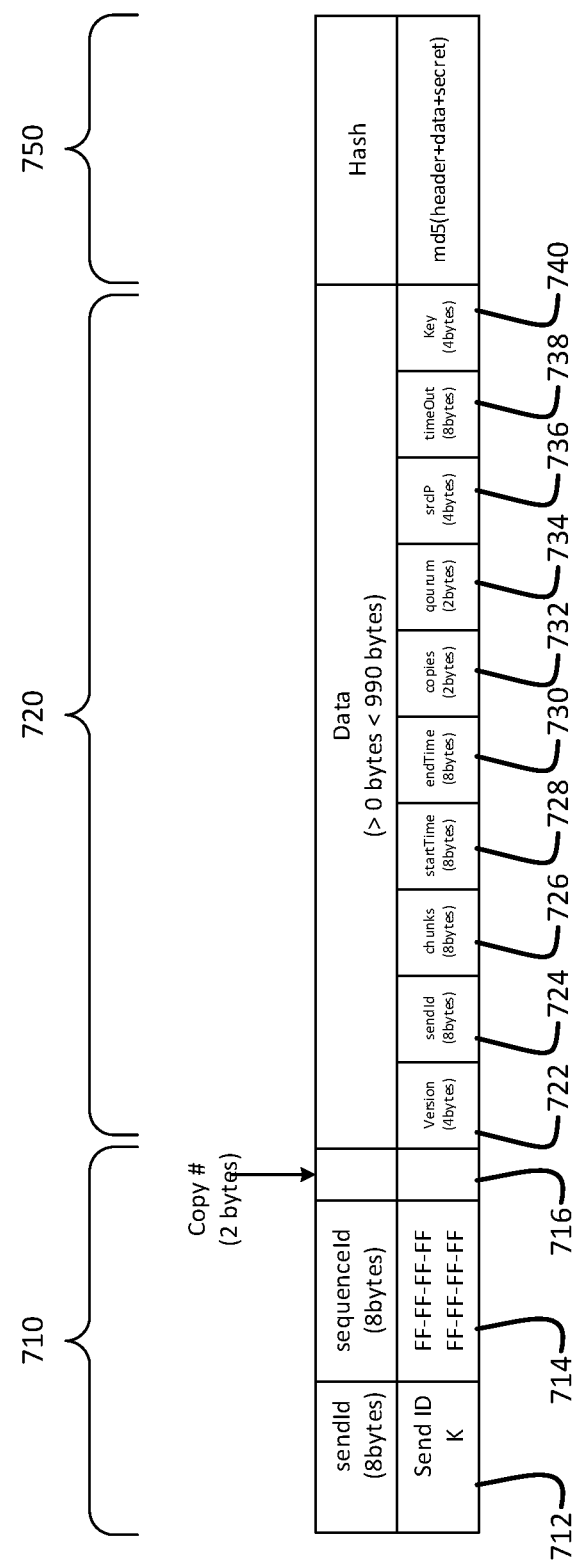
FIG. 7 shows an example of an end control message.

Once all the copies of the data packets have been transmitted, the first gateway may send (transmit) one or more copies of an end control message. FIG. 7 shows an example end control message 700. End control message 700 may be similar to start control message 500 discussed above with respect to FIG. 5. In this regard, end control message 700 may comprise a header 710, a payload 720, and a signature 750.

Header 710, like header 510, may comprise a session identifier field 712, a sequence identifier field 714, and a copy field 714. Like the start control message, the session identifier field 712 may contain the same unique identifier included in the session identifier field 512 and the copy field 716 may indicate the copy number of the current end control message 700. However, the sequence identifier field 714 may be different from both the start control message 500 and the transmitted data packets 600. In this regard, the sequence identifier field may be maxed out (e.g., all 1's in a binary representation, all F's in a hexadecimal representation). This may signal to the second gateway that the message is an end control message and that the communication session has ended.

Payload 720 may comprise the same fields as payload 520. For example, payload 720 may comprise a version field 722, a sendID field 724, a chunks field 726, a start time field 728, an end time field 730, a copies field 732, a quorum field 734, a source IP address field 736, a timeout field 738, and a key identifier field 740.

Finally, the signature 750 may be a message authentication code used to verify (validate) the end control message 700. As discussed above, signature 750 may be generated by hashing the header 710, the payload 720, and a secret. Also or alternatively, the signature may be generated using a private key of the first gateway, the header, the payload, and a signature generating algorithm.

Figure 8:
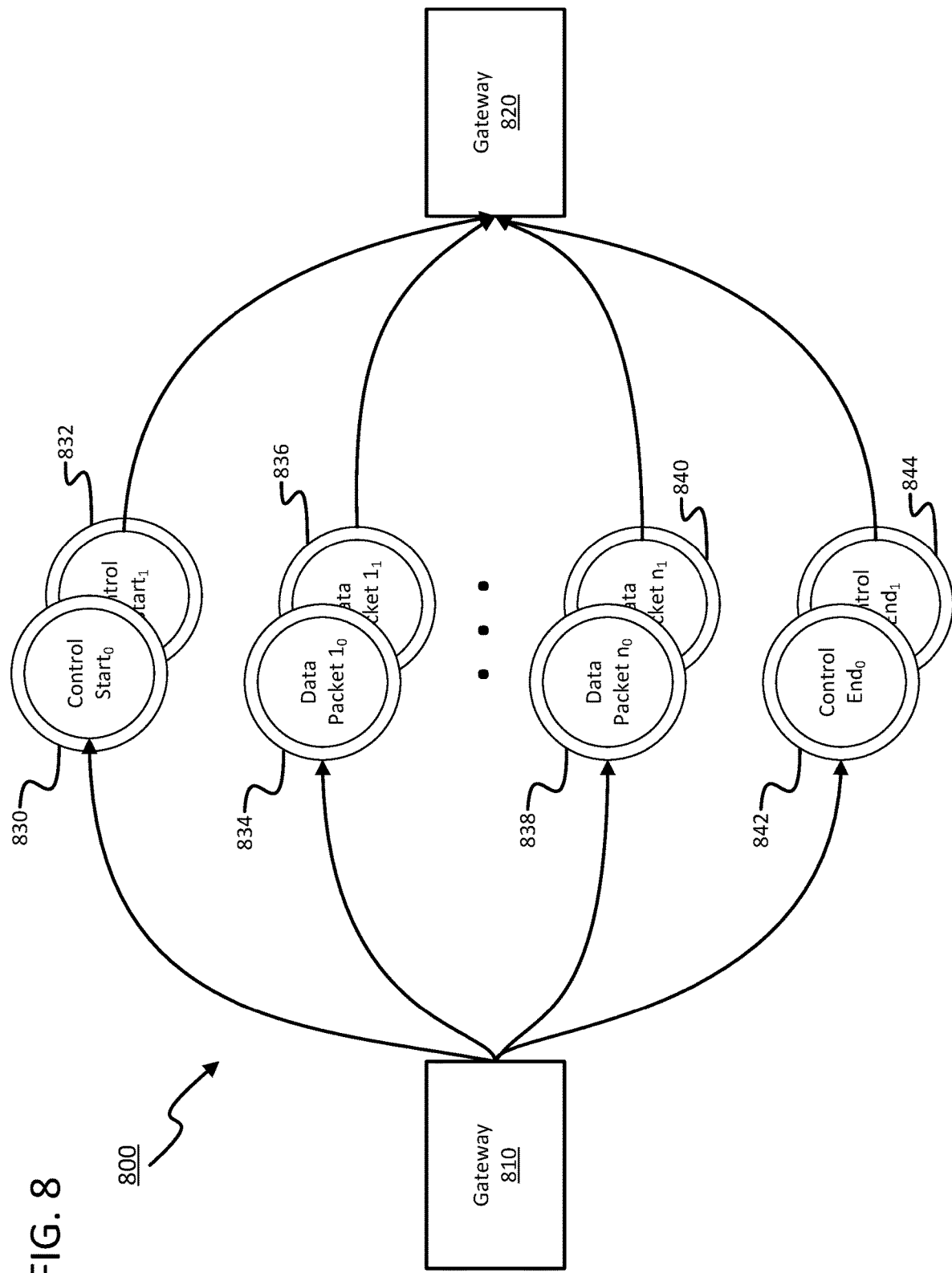
FIG. 8 shows an example of sending data via a unidirectional communication channel.

FIG. 8 shows an example of sending data using the data transfer protocol. In this regard, FIG. 8 shows a system 800 that comprises a first gateway 810 (e.g., the gateway 120) and a second gateway 820 (e.g., the gateway 130). The first gateway 810 may send a first start control message 830 and a second start control message 832 to the second gateway 820 to indicate the beginning of a communication session. The first control message 830, the second start control message 832, and/or other start control messages sent by the gateway 810 may, for example, be similar to start control message 500. The second start control message 832 may be a copy of the first start control message 830. The communication session continues with the first gateway 810 sending a plurality of packets to the second gateway. As shown, first gateway 810 sends a first copy 834 of a first data packet and a second copy 836 of the first data packet. The first gateway may continue sending a first copy 838 of a nth data packet and a second copy 840 of the nth data packet. The first copy 834, the second copy 836, first copy 838, and the second copy 840, and/or other copies of data packets sent by the gateway 810 may, for example, be similar to data packet 600. At the end of the communication session, the first gateway may send a first end control message 842 and a second end control message 844 to the second gateway to indicate the conclusion of the communication session. The end control message 842, the second end control message 844, and/or other end control messages sent by the gateway 810 may, for example, be similar to end control message 700. The second end control message 844 may be a copy of the first end control message 842. While FIG. 8 shows first gateway 810 sending (transmitting) two copies of each packet sent to the second gateway 820, it will be appreciated that more than two copies (e.g., 3, 4, 5, 6, . . . ) may be sent. In the example of FIG. 8, the gateway 810 may perform steps of process 300 and/or the gateway 820 may perform the steps of the process 400.

The above-described systems, devices, and methods may securely transfer data over a unidirectional communication channel. Data may be received at a non-secure, sending gateway, fragmented into smaller chunks, and transmitted to a secure gateway. The secure gateway may reassemble the chunks and send the data across a secure network enclave. This may provide a hardware-agnostic solution for transmitting data over a unidirectional communication channel, thereby improving over existing solutions that require specialized hardware and/or drivers. Further, the combination of rules and flexible transmission characteristics (e.g., more copies, higher quorum, etc.) may improve the reliability and integrity of the data and/or information transmitted via the unidirectional communication channel.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method comprising:
   receiving, by a second gateway from a first gateway via a unidirectional network segment, a start control message;
   receiving, by the second gateway from the first gateway via the unidirectional network segment and after the start control message, a plurality of data packets, wherein at least one data packet of the plurality of data packets is a duplicate of at least one other data packet of the plurality of data packets;
   receiving, by the second gateway from the first gateway via the unidirectional network segment, an end control message; and
   reassembling, by the second gateway, the plurality of data packets into a dataset.

2. The method of claim 1, wherein the start control message comprises a quorum agreement.

3. The method of claim 2, further comprising:
determining, by the second gateway, whether a predetermined number of duplicates of the plurality of data packets have been received to satisfy the quorum agreement, wherein the reassembling the plurality of data packets into the dataset is based on a determination that the quorum agreement has been satisfied.

4. The method of claim 1, further comprising:
decrypting, by the second gateway and using an encryption key, the plurality of data packets.

5. The method of claim 1, further comprising:
verifying, by the second gateway, a signature appended to each of the plurality of data packets.

6. The method of claim 1, further comprising:
forwarding, by the second gateway, the dataset to a destination.

7. The method of claim 1, wherein the unidirectional network segment comprises at least one of a data diode or a satellite link.

8. The method of claim 1, further comprising:
reclassifying the dataset based on receiving the plurality of data packets via the unidirectional network segment.

9. A method comprising:
receiving, by a second gateway from a first gateway via a unidirectional network segment, a start control message, wherein the start control message indicates a quorum agreement;
receiving, by the second gateway from the first gateway via the unidirectional network segment and after the start control message, a plurality of data packets, wherein at least one data packet of the plurality of data packets is a duplicate of at least one other data packet of the plurality of data packets;
receiving, by the second gateway from the first gateway via the unidirectional network segment, an end control message;
determining, by the second gateway, whether a predetermined number of duplicates of the plurality of data packets have been received to satisfy the quorum agreement; and
generating, by the second gateway and based on a determination that the quorum agreement has not been satisfied, an exception.

10. The method of claim 9, further comprising:
notifying, by the second gateway, a user of the exception.

11. The method of claim 9, further comprising:
decrypting, by the second gateway and using an encryption key, the plurality of data packets.

12. The method of claim 9, further comprising:
verifying, by the second gateway, a signature appended to each of the plurality of data packets.

13. The method of claim 9, wherein the unidirectional network segment comprises at least one of a data diode or a satellite link.

14. A method comprising:
sending, from a first gateway to a second gateway via a unidirectional network segment, a start control message;
sending, from the first gateway to the second gateway via the unidirectional network segment and after the start control message, a plurality of data packets, wherein at least one data packet of the plurality of data packets is a duplicate of at least one other data packet of the plurality of data packets; and
sending, from the first gateway to the second gateway via the unidirectional network segment and after sending the plurality of data packets, an end control message.

15. The method of claim 14, further comprising:
determining, by the first gateway, one or more network conditions; and
defining, by the first gateway, a quorum agreement based on the one or more network conditions, wherein the start control message comprises the quorum agreement.

16. The method of claim 14, wherein the start control message comprises a key identifier indicating an encryption key used to encrypt the plurality of data packets.

17. The method of claim 14, further comprising:
generating, by the first gateway, a signature for each of the plurality of data packets; and
appending the signature to a header and a payload for each of the plurality of data packets prior to sending the plurality of data packets to the second gateway.

18. The method of claim 14, wherein the start control message comprises a session identifier, wherein each of the plurality of data packets comprises the session identifier.

19. The method of claim 14, wherein the plurality of data packets comprise a dataset.

20. The method of claim 19, further comprising:
fragmenting the dataset into a plurality of chunks prior to sending the plurality of data packets.

* * * * *